United States Patent [19]

Bobo

[11] Patent Number: 5,768,994
[45] Date of Patent: Jun. 23, 1998

[54] DUAL LEVEL HORIZONTAL WAFFLE IRON APPARATUS AND METHOD

[76] Inventor: Thomas B. Bobo, 6343 Katella Ave., Las Vegas, Nev. 89118-1246

[21] Appl. No.: 729,613

[22] Filed: Oct. 11, 1996

[51] Int. Cl.⁶ .................................................. A47J 37/00
[52] U.S. Cl. ................................ 99/374; 99/375; 99/377; 99/424; 426/523
[58] Field of Search .................... 99/349, 355, 372–384, 99/389, 391, 422–424; 219/524, 525; 426/511, 523, 510, 552, 496

[56] References Cited

U.S. PATENT DOCUMENTS

| | | | |
|---|---|---|---|
| 1,754,800 | 4/1930 | Preston | 99/374 |
| 2,116,688 | 5/1938 | Ratliff | 99/374 |
| 2,300,644 | 11/1942 | Boyd | 99/374 |
| 4,967,650 | 11/1990 | Weigle | 99/377 X |
| 5,299,492 | 4/1994 | Carbon et al. | 99/380 X |

*Primary Examiner*—Timothy F. Simone
*Attorney, Agent, or Firm*—Harry M. Weiss; Jeffrey D. Moy; Harry M. Weiss & Associates, P.C.

[57] ABSTRACT

A dual horizontal level waffle iron apparatus is disclosed which contains first and second horizontally rotatable waffle iron assemblies each containing a cover member, a base member and grid arrays associated therewith. Horizontal rotation is limited to 180 degrees and a pair of handles in cooperation with a pair of hinge arms permit each cover member to be lifted for ease in loading waffle food mixture, removal of waffles and removal of the grid arrays.

21 Claims, 2 Drawing Sheets

DUAL LEVEL HORIZONTAL WAFFLE IRON APPARATUS AND METHOD

BACKGROUND OF THE INVENTION

1. Field of the Invention

This invention relates generally to waffle iron apparatus and methods, and, more specifically, relates to dual level horizontal waffle iron apparatus and methods.

2. Background of the Prior Art

In the past, various types of waffle iron apparatus and methods were developed, manufactured and sold to both consumers and business establishments for the purpose of making various types of waffle products such as Belgian waffles, etc. The most common type of waffle iron apparatus was a single level horizontal waffle iron apparatus which used a base member and cover member that were rotatable about a horizontal axis to facilitate heating of the waffle mix located between each grid array of the cover member and the base member. The cover member became the base member and vice versa when the single level horizontal waffle iron apparatus was rotated 180 degrees about its horizontal axis.

A major disadvantage of this prior single level horizontal waffle iron apparatus was the inability to meet volume waffle demands such as is required in restaurants, banquet halls, etc. Thus attempts at making higher volume or larger quantities of waffles generated various types of production problems, For example, a substantially vertical type dual waffle iron apparatus was produced and sold, however, the waffle food mixture often flowed downwardly under the influence of gravity thus resulting in the production of uneven waffle products.

Another problem associated with high volume production of waffles was the fact that a large amount of heat was generated in the apparatus providing the waffles which made it very difficult to grip the apparatus to handle removal of finished waffles or to grip the apparatus to continue to prepare and make other batches of waffles.

A further problem was the cleaning of the grid arrays because these grid arrays were accumulating food debris as a result of the production of waffles. Many prior type waffle iron apparatus made it very difficult to obtain access to the grid arrays for the cleaning thereof and/or for the rapid removal of these grid arrays for cleaning purposes or to rapidly replace these grid arrays with clean grid arrays.

Thus, there existed a need for a multi-level waffle iron apparatus and method which would provide a large volume of uniformly shaped waffles, minimize the above noted heat problems caused by the heating elements used to heat the waffle food mixture, permit rapid access to the grid arrays to either clean them or to replace them with clean grid arrays, etc.

SUMMARY OF THE INVENTION

It is an object of this invention to provide an improved waffle iron apparatus and method.

It is a further object of this invention to provide an improved dual level wattle iron apparatus and method.

It is another object of this invention to provide an improved dual level horizontal waffle iron apparatus and method which minimizes heating problems caused by the use of heating elements.

It is still a further object of this invention to provide an improved dual level horizontal waffle iron apparatus and method which facilitates cleaning of the grid arrays and/or the removal thereof and replacement with clean grid arrays.

It is another object of this invention to provide an improved dual level horizontal waffle iron apparatus and method that solves a number of important technical problems as set forth below.

BRIEF DESCRIPTION OF THE PREFERRED EMBODIMENTS

In accordance with one embodiment of this invention, a dual level waffle iron apparatus comprises, in combination, a first horizontal level waffle iron assembly having a cover member and a base member, the cover member and the base member of the first horizontal level waffle iron assembly each having a grid array spaced apart from each other; a second horizontal level waffle iron assembly having a cover member and a base member, the cover member and the base member of the second horizontal level waffle iron assembly each having a grid array spaced apart from each other; and rotation means coupled to both the first horizontal level waffle iron assembly and the second horizontal level waffle iron assembly for rotating both the first horizontal level waffle iron assembly and second horizontal level waffle iron assembly about a common horizontal axis to reverse their horizontal positions in the dual level waffle iron apparatus.

In accordance with another embodiment of this invention, a method of providing a dual level waffle iron operation comprises the steps of: providing a first horizontal level waffle iron assembly having a cover member and a base member, the cover member and the base member of the first level waffle iron assembly each having a grid array spaced apart from each other, providing a second horizontal level waffle iron assembly having a cover member and a base member, the cover member and the base member of the second horizontal level waffle iron assembly each having a grid array spaced apart from each other; and rotating both the first horizontal level waffle iron assembly and the second horizontal level waffle iron assembly about a common horizontal axis to reverse their horizontal positions.

DETAILED DESCRIPTION OF THE PREFERRED EMBODIMENTS

Figure 1:
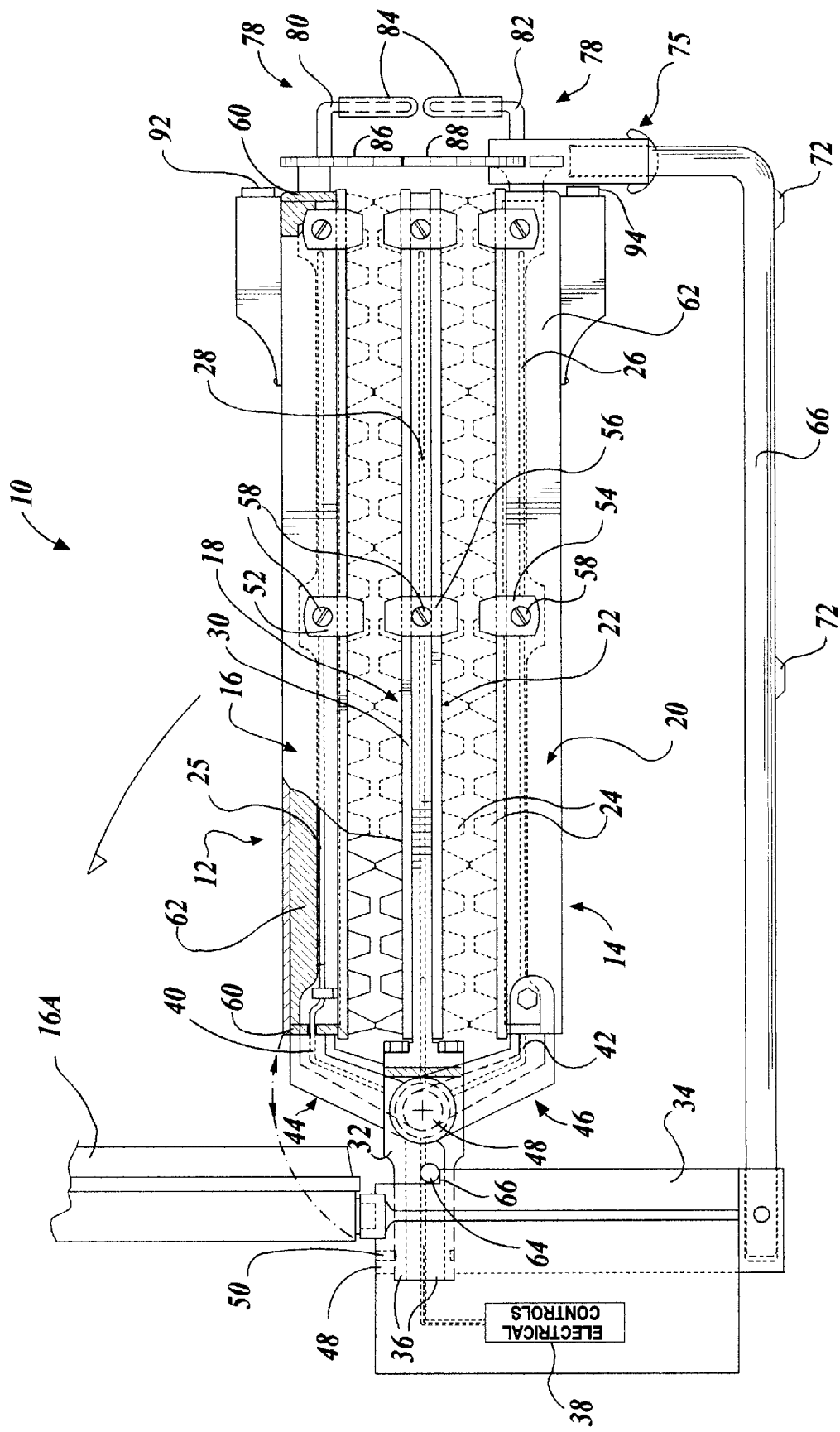
FIG. 1 is a side elevational view, partly in section, showing the dual level horizontal waffle iron apparatus of this invention.

Referring to FIG. 1, reference numeral 10 generally depicts a dual level horizontal waffle iron apparatus of this invention. In the view shown in FIG. 1, the dual level horizontal waffle iron apparatus 10 comprises a first horizontal level waffle iron assembly 12 which is shown in FIG. 1 to be the upper horizontal waffle iron assembly and a second horizontal level waffle iron assembly 14 shown in FIG. 1 to be the lower horizontal waffle iron assembly. The first horizontal level waffle iron assembly 12 comprises a cover member 16 and a base member 18. Similarly, the second horizontal level waffle iron assembly 14 comprises a cover member 20 and a base member 22. Both cover members 16 and 20 and both base members 18 and 22 of the first horizontal level waffle iron assembly 12 and the second horizontal level waffle iron assembly 14 have a grid array 24 comprising a plurality of grid elements. The length and width of the cover members 16 and 20 of the first horizontal level waffle 12 and the second horizontal level waffle iron apparatus 14 can be shaped or varied, as desired, to meet production needs of the dual horizontal level waffle iron apparatus 10. The larger (width and/or length) the cover members 16 and 20 and the base members 18 and 22, the more waffle products can be produced using the dual level horizontal waffle iron apparatus 10.

Heating means in the form of a, preferably, heating resistance type element or coil 25 is located within a lower portion of the cover member 16 of the first horizontal level waffle iron assembly 12 and a similar heating resistance type element or coil 26 is located within a lower portion of the cover member 20 of the second horizontal level waffle iron assembly 14. A single or common heating resistance type element or coil 28 is located within a middle support member 30 that serves as a common support member for both of the base members 18 and 22. The middle support member 30 is located on or about the horizontal axis of the dual level horizontal waffle iron apparatus 10 and is connected to a horizontal support member 32 that is rotatably coupled to a vertical support member 34. The vertical support member 34 contains a preferably annular type bearing means or assembly 36 to permit rotation of the horizontal support member 32 and, consequently, the rotation about their common horizontal axis of the connected first horizontal level waffle iron assembly 12 and the second horizontal level waffle iron assembly 14. The vertical support member 34 is preferable an enclosed container that houses electrical control means 38 that controls the supply of electrical current to the heating resistance type elements or coils 25, 26, and 30 to selectively turn on or off these heating resistance type elements or coils. The electrical control means 38 also provides electrical control of control lights, etc. as described below with reference to FIG. 2. Electrical wiring from the electrical control means 38 to the heating resistance type elements or coils 25 and 26 is provided by, respectively, electrical conduits 40 and 42. The electrical conduits 40 and 42 are located within cavities within hinge arm members 44 and 46, respectively which are rotatably connected at one end to a common pivot pin 48. The pivot pin 48 permits each of the hinge arm members 44 and 46 to rotate or move upwardly to permit the cover member 16 of the first horizontal level waffle iron assembly 12 to be upwardly swung or elevated to the position as shown in phantom in FIG. 1 by reference number 16A. Rotation of the dual level horizontal waffle iron apparatus 10 about its common horizontal axis will cause the second horizontal level waffle iron assembly 14 to become the upper horizontal level waffle iron assembly whereas the first horizontal level waffle iron assembly 12 will now become the lower horizontal level waffle iron assembly. This rotation is achieved as discussed above because of the operation of the bearing means 36 that permits the horizontal support member 32 and the connected middle support member 30 with their respectively connected first and second horizontal level waffle iron assemblies 12 and 14 to rotate about the common horizontal axis. Consequently, whichever horizontal level waffle iron assembly is in the upper position, then the cover member associated with that upper positioned horizontal level waffle iron assembly can be swung or lifted upwardly to permit access to the grid arrays of the associated cover member and base member. Thus, quick and rapid access to these grid arrays is achieved to facilitate cleaning and/or removal thereof and replacement with clean grid arrays. In order to hold the upwardly swung cover member in its upward position to prevent the undesired falling thereof which could possibly hurt someone trying to clean or replace the grid arrays, magnetic means in the form of a permanent magnet member 48 that is attached to the vertical support member 34. Thus, magnetic coupling between the magnet member 48 and a corresponding ferrous metal member (not shown) on both the cover members 16 and 20 provides the gripping action needed to uphold the lifted cover member.

Accordingly, pivoting means provided by the hinge arm members 44 and 46 and the pivot pin 48 permit either respective cover member 16 or 20 to be pivoted upwardly depending upon which cover member is in the upper position. In the embodiment of FIG. 1, the phantom lines 16A depict how the cover member 16 is swung or pivoted to its upward (open) position.

In order to provide rapid access to the grid arrays 24 of the two cover members 16 and 20 and the two base members 18 and 22, removable clip means are provided which comprise, in the embodiment of FIG. 1, a first removable clip member 52 which removably holds in place the grid array of the cover member 16, a second removable clip member 54 similar to the first removable clip member 52, but which removably holds in place the grid array of the cover member 20, and a third removable clip member 56 which removably holds in place both grid arrays of the two base members 18 and 22. Screws or bolts 58 hold each of the removable clip members in place until they are removed by simply rotating the screws or bolts 58 in a counter clockwise direction. If desired, three additional removable clip members (unnumbered) can be used as shown on the right side portion of the dual level horizontal waffle iron apparatus 10 of FIG. 1.

In order to contain the heat as much as possible that is generated by the heating means or heating resistance type elements 25 and 26 located within each of respective cover members 16 and 20, heat insulation means 60 in the form of an rectangular shaped insulation member made of any suitable insulation material is located around the perimeter of the heating resistance type elements 25 and 26 (the insulation means is not shown in FIG. 1 for the heating resistance type element 26). This heat insulation means 60 minimizes the transfer of heat outwardly from the perimeter of each of the heating resistance type elements 25 and 26 to provide greater ease in handling the dual level horizontal waffle iron apparatus 10. For increased thermal insulation of both of the heating resistance type elements 25 and 26, second heat insulation means 62 substantially surround the upper region and the side region about each of the heating resistance type elements 25 and 26 for significantly reducing the transfer of heat from these heating elements.

As discussed above, rotation of the dual level horizontal waffle iron apparatus 10 about its common horizontal axis is permitted by the bearing means 36 and the members rotatably coupled thereto, however, this rotation about the common horizontal axis is limited to no more than 180 degrees to avoid damaging the electrical conduits connected to the heating elements. In order to prevent horizontal rotation beyond 180 degrees, stop means are provided comprising a stop pin 64 connected to the horizontal support member 32. In the position shown in FIG. 1, the stop pin 64 is in contact with a cut out or notched portion 66 in the vertical support member 34. Thus, in this position, the dual level waffle iron apparatus 10 cannot horizontally rotate any further downwardly because of the stopping action of the stop pin 64 engaging the notched portion 66. Similarly, horizontal rotation of more than 180 degrees in the opposite rotational direction is prevented by a corresponding notched or cut out portion (not shown) on the other side of the vertical support member 34 which acts with the stop pin 64 to prevent horizontal rotation more than 180 degrees in the other direction.

Figure 2:
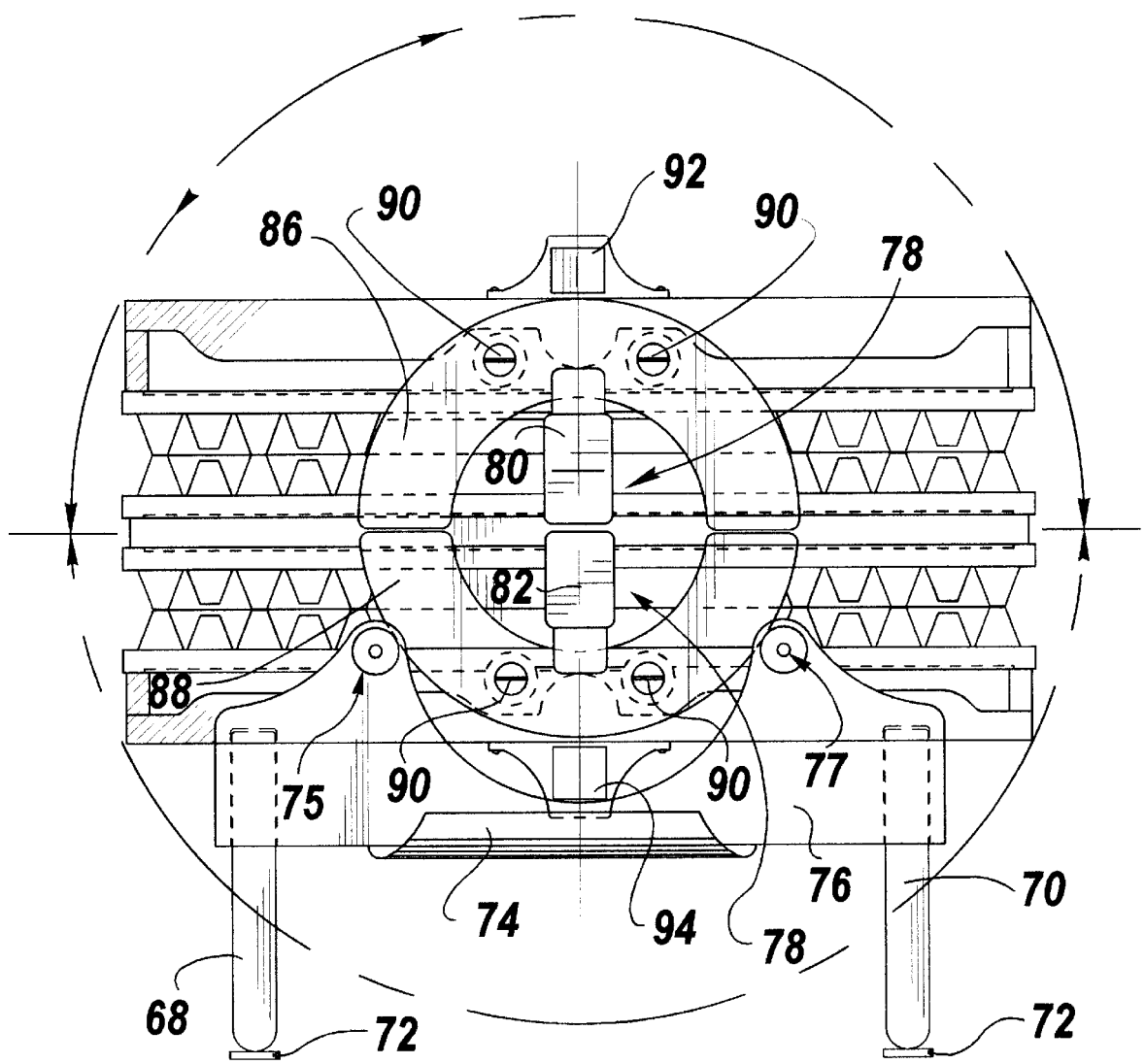
FIG. 2 is a front elevational view, partly in section showing the dual level horizontal waffle iron apparatus of FIG. 1.

With reference to FIG. 2, a pair of horizontal preferably tubular type frame members 66 (only one of which is shown in FIG. 1) are provided at the bottom portion of the dual level horizontal waffle iron apparatus 10 to hold in place this apparatus and to provide stability for the connected vertical support member 36.

With reference to both FIGS. 1 and 2 preferably tubular type vertical frame members 68 and 70 cooperate with the pair of horizontal frame members 66 to provide support for the dual level waffle iron apparatus. Feet members 72 are provided to provide better balanced support for the tubular frame members 66. Handle member 74 facilitates handling or gripping the entire dual level waffle iron apparatus 10 because the handle member 74 is connected to cross frame support member 76 that is connected to the vertical frame members 68 and 70.

A pair of handle means 78 comprising a first handle member 80 connected to the cover member 16 and a second handle member 82 connected to the cover member 20 is provided for several important functions. One function of the pair of handle means 78 is to permit and facilitate gripping of each cover member 16 and 20 for rotation. Since each pair of handle means 78 are located as an extension portion of each cover member 16 and 20 and thermally isolated therefrom by means of the insulation means 60, there is a substantial reduction in the transfer of heat to these pair of handle means 78. Furthermore, greater leverage in lifting each cover member 16 and 20 is made possible because of the configuration of the pair of handle means 78 acting as a lever assembly using the long, in effect, lever arm created by the horizontal length of each cover member 16 and 20. Additionally the pair of handle means 78 facilitates greater torque and rotation of the entire dual level horizontal waffle iron apparatus 10 about its common horizontal axis as best seen in FIG. 2. For increased ease in handling the pair of handle means 78, thermal insulation means 84 in the form of a one side enclosed sleeve of a thermally insulating material such as rubber or the like is provided for preventing accidental skin burns to a person holding one or both of the pair of handle means. 78.

A pair of spaced apart bearing means or bearings 75 and 77 are mounted on a cross support member 76. These pair of bearings 75 and 77 are important for maintaining the horizontal stability of the dual level horizontal waffle iron apparatus 10 because they can support one or the other of the arcuate shaped members 86 and 88 (in the embodiment depicted in FIG. 2 they are shown in support of the arcuate shaped member 88). A set screw 50 can also be used to engage a recess in the horizontal support member 32 to prevent horizontal rotation of the apparatus 10 about its horizontal axis. Consequently, depending on the position of the cover member 16 and 20 whether cover member 16 in on top as shown in FIGS. 1 and 2 or whether cover member 20 is horizontally rotated to be on top, the pair of bearings 75 and 77 stabilize holding the associated arcuate shaped member 86 or 88 in a stable horizontal position. If desired, the set screw 50 can also be used to provide engagement contact to prevent undesired horizontal rotation of the apparatus 10. As shown in FIG. 2, the arcuate shaped members 86 and 88 are respectively fastened to the cover members 16 and 20 by means of screws or bolts 90.

The electrical control means 38 also provide electrical control by electrical connection (not shown) to visual light units 92 and 94 to permit any desired type of visual display to aid in the production of waffles. For example, one of these light units can display a timed green light to indicate one type of operation such as a cooking cycle for heating the resistance elements in the two cover members and the base member and to provide flashing when the waffles are finished. The other light unit can display a red light indicating that the heating operation is over and that the waffles can now be turned to the other horizontal position or removed. Various types of visual and, if desired, audio signals can be provided by audio speaker means (not shown) electrically connected to the electrical control means 38 to indicate each phase of the entire operation including loading the waffle food mixture between the grid arrays, etc.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A dual level waffle iron apparatus comprising, in combination:

a first horizontal level waffle iron assembly having a cover member and a base member, said cover member and said base member of said first horizontal level waffle iron assembly each having a grid array spaced apart from each other;

a second horizontal level waffle iron assembly having a cover member and a base member, said cover member and said base member of said second horizontal level waffle iron assembly each having a grid array spaced apart from each other;

said base member of said second horizontal level waffle iron assembly being separated from said base member of said first horizontal level waffle iron assembly and space therefrom; and rotation means coupled to both said first horizontal level waffle iron assembly and said second horizontal level waffle iron assembly for rotating both said first horizontal level waffle iron assembly and second horizontal level waffle iron assembly about a common horizontal axis to reverse their horizontal positions in said dual level waffle iron apparatus.

2. The dual level waffle iron apparatus as defined in claim 1 including heating means located within each said cover member and base member of said first horizontal level waffle iron assembly and said second horizontal level waffle iron assembly for heating a waffle type food mixture to create waffles between each grid array of said cover member and said base member of both said first horizontal level waffle iron assembly and said second horizontal level waffle iron assembly.

3. The dual level waffle iron apparatus of claim 1 wherein each said grid array of said cover member and said base member of both said first horizontal level waffle iron assembly and said second horizontal level waffle iron assembly is removable.

4. The dual level waffle iron apparatus of claim 1 including a middle support member connected to said base member of both said first horizontal level waffle iron assembly and second horizontal level waffle iron assembly, said middle support member being located about said common horizontal axis and connected to said rotation means.

5. The dual level waffle iron apparatus of claim 1 wherein said cover member of both said first horizontal level waffle iron assembly and said second horizontal level waffle iron assembly each having pivoting means located at one end portion of each said cover member for alternatively pivoting each said cover member upwardly to permit access to said grid array of each said cover member and said grid array of each associated base member.

6. The dual level waffle iron apparatus of claim 5 wherein each said pivoting means comprising at least one hinge arm member and a pivot pin rotatably coupled to said hinge arm member.

7. The dual level waffle iron apparatus of claim 2 including heat insulation means located around a perimeter of each said cover member of said first horizontal level waffle iron assembly and said second horizontal level waffle iron assembly for significantly reducing transfer of heat from said heating means within each said cover member to other portions of said dual level waffle iron apparatus.

8. The dual level waffle iron apparatus of claim 5 including magnetic means located on a portion of said dual level waffle iron apparatus for magnetically coupling to an external portion of each said cover member of said first horizontal level waffle iron assembly and said second horizontal level waffle iron assembly when each said cover member is alternatively pivoted to its upward position to thereby hold each said cover member to prevent undesired accidental falling of each said cover member.

9. The dual level waffle iron apparatus of claim 2 including electrical control means located within an enclosed container at one end portion of said dual level waffle iron apparatus for selectively controlling heating of said heating means located within each said cover member and said base member of said first horizontal level waffle iron assembly and said second horizontal level waffle iron assembly.

10. The dual level waffle iron apparatus of claim 1 including removable clip means for removably holding in place each said grid array of said cover member and said base member of said first horizontal level waffle iron assembly and each said grid array of said cover member and said base member of said second horizontal level waffle iron assembly.

11. The dual level waffle iron apparatus of claim 10 wherein said removable clip means comprising a first removable clip member removably holding said grid array of said cover member of said first horizontal level waffle iron assembly, a second removable clip member removably holding said grid array of said cover member of said second horizontal level waffle iron assembly and a third clip member removably holding said grid array of said base member of both said first horizontal level waffle iron assembly and said second horizontal level waffle iron assembly.

12. The dual level waffle iron apparatus of claim 1 including a pair of handle leverage means for providing gripping of said cover member of both said first horizontal level waffle iron assembly and said second horizontal level waffle iron assembly, for providing leverage for lifting each said cover member and for permitting rotation about said common horizontal axis of both said first horizontal level waffle iron assembly and said second horizontal level waffle iron assembly, one of said pair of handle means coupled to said cover member of said first horizontal level waffle iron assembly, the other of said pair of handle means coupled to said cover member of said second horizontal level waffle iron assembly.

13. The dual level waffle iron apparatus of claim 12 wherein each one of said pair of handle means having thermal insulation means connected thereto for preventing accidental skin burns to a person holding each one of said pair of handle means.

14. The dual level waffle iron apparatus of claim 12 including first and second heat insulation means substantially surrounding said heating means within each said cover member for significantly reducing transfer of heat from said heating means located within each said cover member.

15. The dual level waffle iron apparatus of claim 1 including a vertical support member located at an end portion of said dual level waffle iron apparatus and coupled to said first horizontal level waffle iron assembly and said second horizontal level waffle iron assembly, said rotation means comprising bearing means connected to a portion of said vertical support member for permitting joint rotation of said first horizontal level waffle iron assembly and said second horizontal level waffle iron assembly about said common horizontal axis.

16. The dual level waffle iron apparatus of claim 15 including a horizontal support member connected at one end to said bearing means for rotation therewith and connected at the other end to both said first horizontal level waffle iron assembly and said second horizontal level waffle iron assembly.

17. The dual level waffle iron apparatus of claim 16 including stop means located on said vertical support member for preventing rotation of both said first horizontal level waffle iron assembly and said second horizontal waffle iron assembly more than 180 degrees about said common horizontal axis.

18. The dual level waffle iron apparatus as defined in claim 17 including a stop pin connected to a portion of said horizontal support member, said stop pin limiting rotation about said common horizontal axis of both said first horizontal level waffle iron assembly and said second horizontal level waffle iron assembly to 180 degrees, a middle support member connected to said base member of both said first horizontal level waffle iron assembly and second horizontal level waffle iron assembly, said middle support member being located about said common horizontal axis and connected to said horizontal support member.

19. The dual level waffle iron apparatus as defined in claim 1 including heating means located within each said cover member and base member of said first horizontal level waffle iron assembly and said second horizontal level waffle iron assembly for heating a waffle type food mixture to create waffles between each grid array of said cover member and said base member of both said first horizontal level waffle iron assembly and said second horizontal level waffle iron assembly, each said grid array of said cover member and said base member of both said first horizontal level waffle iron assembly and said second horizontal level waffle iron assembly is removable, a middle support member connected to said base member of both said first horizontal level waffle iron assembly and said second horizontal level waffle iron assembly, said middle support member being located about said common horizontal axis and connected to said rotation means, said cover member of both said first horizontal level waffle iron assembly and said second horizontal level waffle iron assembly each having pivoting means located at one end portion of each said cover member for alternatively pivoting each maid cover member upwardly to permit access to said grid array of each said cover member and said grid array of each associated base member, each said pivoting means comprising at least one hinge arm member and a pivot pin rotatably coupled to said hinge arm member, first heat insulation means located around a perimeter of each said cover member and base member of said first horizontal level waffle iron assembly and said second horizontal level waffle iron assembly for significantly reducing transfer of heat from said heating means within each said cover member to other portions of said dual level waffle iron apparatus, magnetic means located on a portion of said dual level waffle iron apparatus for magnetically coupling to an external portion of each said cover member of said first horizontal level waffle iron assembly and said second horizontal level waffle iron assembly when each said cover member is alternatively pivoted to its upward position to thereby hold each said cover member to prevent undesired accidental falling of each said cover member, electrical control means located within an enclosed container at one end portion of said dual level waffle iron apparatus for selectively controlling heating of said heating means located within each said cover member and said base member of said first horizontal level waffle iron assembly and said second horizontal level waffle iron assembly, removable clip means for removably holding in place each said grid array of said cover member and said base member of said first horizontal level waffle iron assembly and each said grid array of said cover member and said base member of said second horizontal level waffle iron assembly, said removable clip means comprising a first removable clip member removably holding said grid array of said cover member of said first horizontal level waffle iron assembly, a second removable clip member removably holding said grid array of said cover member of said second horizontal level waffle iron assembly and a third clip member removably holding said grid array of said base member of both said first horizontal level waffle iron assembly and said second horizontal level waffle iron assembly, a pair of handle leverage means for providing gripping of said cover member of both said first horizontal level waffle iron assembly and said second horizontal level waffle iron assembly, for providing leverage for lifting each said cover member and for permitting rotation about said common horizontal axis of both said first horizontal level waffle iron assembly and said second horizontal level waffle iron assembly, one of said pair of handle means coupled to said cover member of said first horizontal level waffle iron assembly, the other of said pair of handle means coupled to said cover member of said second horizontal level waffle iron assembly, each one of said pair of handle means having thermal insulation means connected thereto for preventing accidental skin burns to a person holding each one of said pair of handle means, second heat insulation means and said first heat insulation means substantially surrounding said heating means within each said cover member for significantly reducing transfer of heat from said heating means located within each said cover member, a vertical support member located at an end portion of said dual level waffle iron apparatus and coupled to said first horizontal level waffle iron assembly and said second horizontal waffle iron assembly, said rotation means comprising bearing means connected to a portion of said vertical support member for permitting joint rotation of said first horizontal level waffle iron assembly and said second horizontal level waffle iron assembly about said common horizontal axis, a horizontal support member connected at one end to said bearing means for rotation therewith and connected at the other end to both said first horizontal level waffle iron assembly and said second horizontal level waffle iron assembly, stop means located on said vertical support member for preventing rotation of both said first horizontal level waffle iron assembly and said second horizontal level waffle iron assembly more than 180 degrees about said common horizontal axis, and a stop pin connected to a portion of said horizontal support member, said stop pin limiting rotation about said common horizontal axis of both said first horizontal level waffle iron assembly and said second horizontal level waffle iron assembly to 180 degrees.

20. The dual level waffle iron apparatus as defined in claim 1 including a pair of arcuate shaped members each connected to a different cover member, and a pair of spaced apart bearing means rotatably coupled to said pair of arcuate shaped members for permitting rotation of said apparatus about said common horizontal axis and for providing a support position for each one of said pair of arcuate shaped members that is alternately in contact with said pair of spaced apart bearing means to hold against undesired rotation of said dual level waffle iron apparatus.

21. A method of providing a dual level waffle iron operation comprising the step of:

providing a first horizontal level waffle iron assembly having a cover member and a base member, said cover memver and said base member of said first level waffle iron assembly each having a grid array spaced apart from each other;

providing a second horizontal level waffle iron assembly having a cover member and a base member, said cover member and said base member of said second horizontal level waffle iron assembly each having a grid array spaced apart from each other;

said base member of said second horizontal level waffle iron assembly being separate from said base member of said first horizontal level waffle iron assembly and spaced therefrom; and rotating both said first horizontal level waffle iron assembly and said second horizontal level waffle iron assembly about a common horizontal axis to reverse their horizontal positions.

\* \* \* \* \*